United States Patent
Feng et al.

(10) Patent No.: US 9,255,493 B2
(45) Date of Patent: Feb. 9, 2016

(54) CLEAN ENERGY GENERATION SYSTEM

(71) Applicants: Yee-Chang Feng, Taichung (TW); Po-Lo Feng, New Taipei (TW)

(72) Inventors: Yee-Chang Feng, Taichung (TW); Po-Lo Feng, New Taipei (TW)

(*) Notice: Subject to any disclaimer, the term of this patent is extended or adjusted under 35 U.S.C. 154(b) by 13 days.

(21) Appl. No.: 14/286,794

(22) Filed: May 23, 2014

(65) Prior Publication Data
US 2015/0337676 A1 Nov. 26, 2015

(51) Int. Cl.
| | | |
|---|---|---|
| F01D 15/10 | (2006.01) | |
| F02C 6/00 | (2006.01) | |
| H02K 7/18 | (2006.01) | |
| H02P 9/04 | (2006.01) | |
| F03D 9/00 | (2006.01) | |

(52) U.S. Cl.
CPC ..................... *F01D 15/10* (2013.01)

(58) Field of Classification Search
USPC ........................................ 290/52, 55
See application file for complete search history.

(56) References Cited

U.S. PATENT DOCUMENTS

| | | | | |
|---|---|---|---|---|
| 4,408,127 A * | 10/1983 | Santos, Sr. | ...... | 290/54 |
| 4,779,006 A * | 10/1988 | Wortham | ...... | 290/55 |
| 5,734,202 A * | 3/1998 | Shuler | ...... | 290/55 |
| 5,800,121 A * | 9/1998 | Fanelli | ...... | 415/199.5 |
| 7,821,152 B1* | 10/2010 | Young | ...... | 290/55 |
| 8,051,637 B2* | 11/2011 | Labrador | ...... | 60/39.01 |
| 8,430,605 B2* | 4/2013 | Dietterich | ...... | 406/197 |
| 8,441,140 B2* | 5/2013 | Abou-Zeid | ...... | 290/55 |
| 8,875,511 B2* | 11/2014 | Simpson | ...... | 60/641.2 |
| 9,175,868 B2* | 11/2015 | Fadell | ...... | G05D 23/1902 |
| 2003/0227175 A1* | 12/2003 | Manolis et al. | ...... | 290/55 |
| 2005/0109030 A1* | 5/2005 | Manolis et al. | ...... | 60/641.8 |
| 2005/0120715 A1* | 6/2005 | Labrador | ...... | 60/618 |
| 2008/0155985 A1* | 7/2008 | Labrador | ...... | 60/698 |
| 2011/0285139 A1* | 11/2011 | Falbo | ...... | 290/55 |
| 2012/0001428 A1* | 1/2012 | Calhoon et al. | ...... | 290/44 |
| 2013/0074516 A1* | 3/2013 | Heward et al. | ...... | 60/786 |
| 2013/0257055 A1* | 10/2013 | Simpson | ...... | 290/52 |
| 2014/0053641 A1* | 2/2014 | Brostmeyer | ...... | 73/112.01 |
| 2014/0183867 A1* | 7/2014 | Alvi | ...... | 290/52 |
| 2015/0308103 A1* | 10/2015 | Dyson | ...... | F24F 7/00 165/47 |

OTHER PUBLICATIONS

SIEMENS—Pictures of the Future, Fall 2012, www.siemens.com/pof, pp. 1-119.
International Energy Agency—World Energy Outlook 2012, pp. 1-669.

(Continued)

*Primary Examiner* — Pedro J Cuevas
(74) *Attorney, Agent, or Firm* — Muncy, Geissler, Olds & Lowe, P.C.

(57) ABSTRACT

A clean energy generation system, comprising at least one energy generation unit, each of which comprises a wind tunnel, an air/gas turbine, a generator, at least one heating device and an air/gas compressor. The wind tunnel includes a contraction section, a test section and a diffuser section. The air/gas turbine is located in the test section or the diffuser section and is coupled to the generator. The at least one heating device is located in the contraction section for preheating the air/gas flowing through the at least one heating device. The air/gas compressor is for compressing the air/gas flowing through the air/gas compressor and is located in the diffuser section or in the contraction section between the at least one heating device and the air/gas turbine. The air/gas turbine is driven by the preheated and compressed air/gas such that the generator is driven to generate electricity.

20 Claims, 10 Drawing Sheets

(56) References Cited

OTHER PUBLICATIONS eia—U.S. Energy Information Admnistration, "Levelized Cost of New Generation Resources in the Annual Energy Outlook 2013," Jan. 2013, pp. 1-5.

Library of Congress—Wind Tunnels of the Eastern Hemisphere, Aug. 2008, pp. 1-637.

A.J. Seebregts, "Gas-Fired Power," IEA ETSAP—Technology Brief E02;Apr. 2010, pp. 1-5.

F. Neumayer et al., "Operational Behavior of a Complex Transonic Test Turbine Facility," Proceedings of the ASME: Turbo Expo Jun. 2001, pp. 1-8.

I. Treager, "Aircraft Gas Turbine Engine Technology," Chapter 3 Engine Theory: Two Plus Two, Nov. 13, 1995, p. 151.

\* cited by examiner

CLEAN ENERGY GENERATION SYSTEM

FIELD OF THE INVENTION

The present invention relates to a clean energy generation system, in particular to a clean energy generation system, in which an air/gas turbine, an air/gas compressor and at least one heating device are disposed in a wind tunnel and the air/gas turbine is driven by the preheated and compressed air/gas such that a generator is driven to generate electricity.

BACKGROUND OF THE INVENTION

Global issues have heavily focused on energy and climate change. Energy is at the core of economic growth, and power sector still remains the most attractive area for investors. Bloomberg New Energy Finance estimates global electricity demand is forecast to rise by two third between 2013 and 2030. Global energy trend calls for $37 trillion of investment in the world's energy supply infrastructure to 2035 (International Energy Agency new policies scenario, P. 49 of "World Energy Outlook 2012"), averagely $1.54 trillion each year. Siemens AG estimates, from 2012 to 2030, new power plant capacity needed globally are 7TW (newly added 4.7TW+ Replacement of decommissioned 2.3TW, Siemens "Pictures of the Future, Fall 2012"), averagely 0.368TW each year, thus global cumulative electric power capacity in 2030 will be 10.5TW.

On the other hand, global energy-related $CO_2$ emissions increased by 1.4% to reach 31.6 gigatones in 2012, a historic high. These were almost all from fossil fuel combustion. Unfortunately, the climate clock is ticking as concentrations of $CO_2$ in our atmosphere has reached 400 ppm, the highest in three million years, and a threshold that most scientists believe is a milestone into potentially irreversible climatic consequences, such as heat waves, droughts, catastrophic storms & floods, which have been real threats to our survival.

Two emerging but crucial facts regarding global energy, the first is the reserves (Everlasting Renewable Energy vs. Depleting Conventional Energy) and the second is the cost competition (Declining/Plummeting Renewable Energy Cost vs. Rising Conventional Energy Cost). The Reveal is that the renewable energy is not an alternative, it is the only alternative.

The accidents of Three Mile Island, Chernobyl, & Fukushima disclose that no nuclear energy is 100% safe. Among 427 nuclear power reactors in operation globally, 192 have operated for 30 years of which 44 have run for 40 years or more. For safety consideration, these aged reactors should be shut down as soon as possible. Also, disposal of radioactive nuclear waste often contaminates its storage sites. Renewable energy, combined with energy efficiency, offers a viable & potent solution to countering the effects of climate change.

The U.S. President Obama says that there's no contradiction between a sound environment and strong economic growth. Thus, technology to generate clean energy with possibly highest efficiency & energy density is urgently needed to reduce Greenhouse Gas emissions as fossil fuel still remains in dominance of our world. Such crisis has triggered global rethinking and reorientation of the future of mankind. So this invention is worked out for a new and better clean energy generation technology pledging to this goal.

SUMMARY OF THE INVENTION

The main object of the present invention is to provide a clean energy generation system with higher efficiency and less pollution. And the clean energy generation system can combine the geothermal energy as the energy supply for generating electricity.

To reach the objects stated above, the present invention provides a clean energy generation system, comprising at least one energy generation unit, each of which comprises a wind tunnel, an air/gas turbine, a generator, at least one heating device and an air/gas compressor.

Said wind tunnel includes a contraction section, a test section and a diffuser section; said contraction section, said test section and said diffuser section are arranged in tandem; and said test section is connected to said contraction section and said diffuser section respectively; wherein said wind tunnel has a tunnel contraction end and a tunnel diffuser end.

Said air/gas turbine is located in said test section or said diffuser section. Said generator is coupled to said air/gas turbine. Said at least one heating device is for preheating the air/gas flowing through said at least one heating device; wherein said at least one heating device is located in said contraction section.

Said air/gas compressor is for compressing the air/gas flowing through said air/gas compressor, wherein said air/gas compressor is located in said contraction section, and said air/gas compressor is between said at least one heating device and said air/gas turbine or said air/gas compressor is located in said diffuser section; wherein said air/gas turbine is driven by the preheated and compressed air/gas such that said generator is driven to generate electricity.

In an embodiment, said clean energy generation system comprises one energy generation unit and a connecting tube, and two ends of said connecting tube are connected respectively to said tunnel diffuser end and said tunnel contraction end of said energy generation unit so as to form a single-unit closed loop system.

In another embodiment, said clean energy generation system comprises plural energy generation units and at least one said connecting tube, and plural energy generation units are arranged in an open loop so as to form a multiple-unit open loop system, wherein between every two adjacent energy generation units one of said connecting tube is inserted and two ends of said connecting tube are connected respectively to said tunnel diffuser end of one energy generation unit and to said tunnel contraction end of the other energy generation unit.

In the other embodiment, said clean energy generation system comprises plural energy generation units and plural said connecting tubes, and plural energy generation units are arranged in an closed loop so as to form a multiple-unit closed loop system, wherein between every two adjacent energy generation units one of plural said connecting tubes is inserted and two ends of said connecting tube are connected respectively to said tunnel diffuser end of one energy generation unit and to said tunnel contraction end of the other energy generation unit.

In one embodiment, said at least one heating device is located in said contraction section or in said connecting tube; said air/gas compressor is located in said contraction section or in said connecting tube; and said air/gas compressor is between said at least one heating device and said air/gas turbine such that the air/gas is firstly preheated by said at least one heating device and secondly compressed by said air/gas compressor, and then the air/gas flows through said air/gas turbine and drives said air/gas turbine so as to drive said generator to generate electricity.

In an embodiment, said wind tunnel and said connecting tube are provided with at least one thermal insulating layer for preventing heat dissipation.

In another embodiment, said wind tunnel and said connecting tube are made of thermal insulating material for preventing heat dissipation.

In one embodiment, each of said at least one heating device has a heat sink, and said heat sink is located in said contraction section or in said connecting tube.

In an embodiment, said heat sink includes a tube strung with plural cooling fins, each of said plural cooling fins has a cross-sectional shape of an aircraft wing profile and has a leading edge and a trailing edge; wherein said plural cooling fins are arranged in parallel and in the orientation such that the air/gas flows through said plural cooling fins along the direction from said leading edge to said trailing edge.

In another embodiment, further comprising at least one air/gas inlet valve, each of which is disposed at said tunnel contraction end or said connecting tube, and said at least one air/gas inlet valve is controlled for air/gas inflowing.

In one embodiment, further comprising at least one inlet guide vane, each of which is disposed at said tunnel contraction end or said connecting tube, and said at least one inlet guide vane is controlled for steering air/gas inflowing.

In an embodiment, further comprising at least one internal guide vane, each of which is disposed at said contraction section, said connecting tube or said diffusion section, and said at least one internal guide vane is controlled for smoothing the air/gas flows in said wind tunnel or in said connecting tube.

In another embodiment, further comprising at least one air/gas outlet valve, each of which is disposed at said tunnel diffuser end, and said at least one air/gas outlet valve is controlled for air/gas outgassing.

In one embodiment, further comprising at least one outlet guide vane, each of which is disposed at said tunnel diffuser end, and said at least one outlet guide vane is controlled for steering air/gas outgassing.

In an embodiment, each of said at least one heating device has a heat source disposed outside of said wind tunnel.

In another embodiment, each of said at least one heating device is a heat pump.

In another embodiment, said gas is nitrogen gas or carbon dioxide gas.

For further understanding the characteristics and effects of the present invention, some preferred embodiments referred to drawings are in detail described as follows.

DETAILED DESCRIPTIONS OF PREFERRED EMBODIMENTS

Figure 1A:
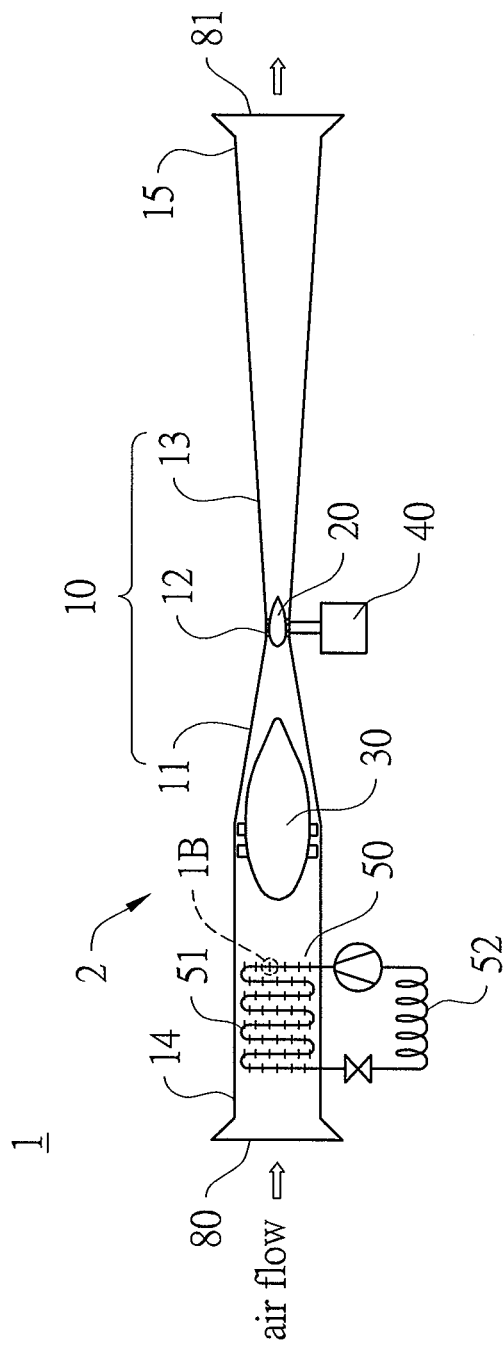
FIG. 1A is a sectional view of an embodiment of single energy generation unit open loop system of the present invention.

Please refer to FIG. 1A, which is a sectional view of an embodiment of single energy generation unit open loop system of the present invention. In this embodiment, a clean energy generation system 1 comprises an energy generation unit 2. The energy generation unit 2 comprises a wind tunnel 10, an air/gas turbine 20, a generator 40, at least one heating device 50 and an air/gas compressor 30 to form a single energy generation unit open loop system.

The wind tunnel 10 includes a contraction section 11, a test section 12 and a diffuser section 13. The contraction section 11, the test section 12 and the diffuser section 13 are arranged in tandem. Two ends of the test section 12 are connected to the contraction section 11 and the diffuser section 13 respectively. The wind tunnel 10 has two ends, the tunnel contraction end 14 and the tunnel diffuser end 15.

The air/gas turbine 20 is located in the test section 12. The generator 40 is couple to the air/gas turbine 20. The location of the generator 40 may be in the test section 12, the contraction section 11, the diffuser section 13 or outside of the wind tunnel 10.

The at least one heating device 50 is located in the contraction section 11. The at least one heating device 50 preheats the air/gas flowing through the at least one heating device 50.

The air/gas compressor 30 is for compressing the air/gas flowing through the air/gas compressor 30. The location of the air/gas compressor 30 is in the contraction section 11, and the air/gas compressor 30 is between the at least one heating device 50 and the air/gas turbine 20, as shown in FIG. 1A.

The air/gas flows from the tunnel contraction end 14 into the wind tunnel 10. When the air/gas flows through the at least one heating device 50, the at least one heating device 50 preheats the air/gas. When the air/gas flows through the air/gas compressor 30, the air/gas compressor 30 compresses the air/gas. When the air/gas which is preheated by the at least one heating device 50 and compressed by the compressor 30 flows through the air/gas turbine 20, the air/gas turbine 20 is driven to rotate. Since the generator 40 is coupled to the air/gas turbine 20, the generator 40 is driven to generate electricity.

Before the air/gas flows through the air/gas turbine 20, the air/gas is compressed and preheated, that is the air/gas is in high temperature and high pressure. When the air/gas flows through the air/gas turbine 20, the high temperature and high pressure air/gas provides the energy for driving the air/gas turbine 20 and hence driving the generator 40 to generate electricity. After the air/gas flows through the air/gas turbine 20, the pressure and the temperature of the air/gas will be lowered down. Most of the energy difference of the air/gas before flowing into the air/gas turbine 20 and after flowing through the air/gas turbine 20 provides the generator 40 to generate electricity.

Each of the at least one heating device 50 has a heat source 52 disposed outside of the wind tunnel 10.

Each of the at least one heating device 50 has a heat sink 51. The heat sink 51 is located in the contraction section 11.

Each of the at least one heating device 50 may be a heat pump. And the heat pump may include a heat source 52 and a heat sink 51. The heat source 50 is disposed outside of the wind tunnel 10 and the heat sink 51 is location in the contraction section 11.

The heat source 52 may be installed near the geothermal area. As the energy supply, the heat source 52 may deliver geothermal heat to the destination the heat sink 51 in the contraction section 11. Hence the heat sink 51 may have the energy to preheat the air/gas flowing through the heat sink 51.

The energy generation unit 2 may further comprise at least one air/gas inlet valve 80, each of which is disposed at the tunnel contraction end 14.

The energy generation unit 2 may further comprise at least one air/gas outlet valve 81, each of which is disposed at the tunnel diffuser end 15.

The air may be the ambient air from the atmosphere. The gas may be nitrogen gas or carbon dioxide gas. In the case when the air is used, the clean energy generation system 1 may be installed such that the at least one air/gas inlet valve 80 and the at least one air/gas outlet valve 81 are connected to the atmosphere while in the other case when the gas is used, the clean energy generation system 1 may be installed such that the at least one air/gas inlet valve 80 and the at least one air/gas outlet valve 81 are connected to the gas storage tank.

The air/gas inlet valve 80 is controlled for air/gas inflowing. The air/gas inlet valve 80 may be programmed to control to let the ambient air/gas flow into the wind tunnel 10. The air/gas filter may be provided in the air/gas inlet valve 80 for preventing the wind tunnel 10 from the pollution of the dust. The humidity controlled may be provided in the air/gas inlet valve 80 for controlling the humidity of the air/gas flowing in the wind tunnel 10.

The energy generation unit 2 may further comprise at least one inlet guide vane 82, each of which is disposed at the tunnel contraction end 14. The inlet guide vane 82 may be programmed to control for steering air/gas inflowing. When the air/gas inlet valve 80 is opened, the inlet guide vane 82 may be programmed to control to guide the ambient air/gas flow into the wind tunnel 10.

The air/gas outlet valve 81 may be programmed to control to let the air/gas inside the wind tunnel 10 for air/gas outgassing. Since after the air/gas flowing through the air/gas turbine 20, the pressure and the temperature of the air/gas will be lowered down, the temperature of the air/gas may become lower than the ambient temperature. Hence the air/gas outlet valve 81 may be controlled for air/gas outgassing to exhaust the low temperature air/gas. Sometimes the temperature of the air/gas after flowing through the air/gas turbine 20 will be too low to cause condensation. The air/gas outlet valve 81 may prevent danger of condensation.

The energy generation unit 2 may further comprise at least one outlet guide vane 83, each of which is disposed at the tunnel diffuser end 15. The outlet guide vane 83 may be programmed to control for steering air/gas outgassing. When the air/gas outlet valve 81 is opened, the outlet guide vane 83 may be programmed to control to guide the air/gas inside the wind tunnel 10 for steering air/gas outgassing.

The wind tunnel 10 may be provided with at least one thermal insulating layer for preventing heat dissipation. Or the wind tunnel 10 may be made of thermal insulating material for preventing heat dissipation. Or the wind tunnel 10 may be provided with at least one thermal insulating layer and may be made of thermal insulating material for preventing heat dissipation.

Figure 1B:
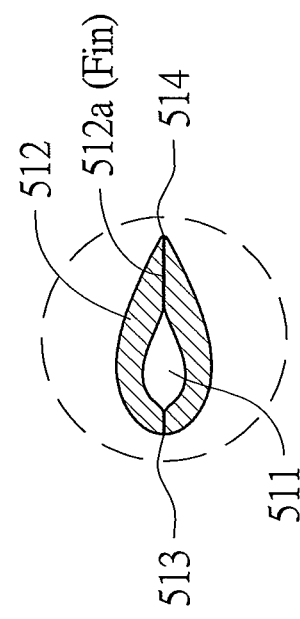
FIG. 1B is a partial enlargement view of the heat sink of an embodiment of the present invention.

Please refer to FIG. 1B, which is a partial enlargement view of the heat sink of an embodiment of the present invention. The heat sink 51 includes a tube 511 strung with plural cooling fins 512/512*a*. Each of the plural cooling fins 512 has a cross-sectional shape of an aircraft wing profile and has a leading edge 513 and a trailing edge 514. The plural cooling fins 512 are arranged in parallel and in the orientation such that the air/gas flows through the plural cooling fins 512 along the direction from the leading edge 513 to the trailing edge 514.

Figure 1C:
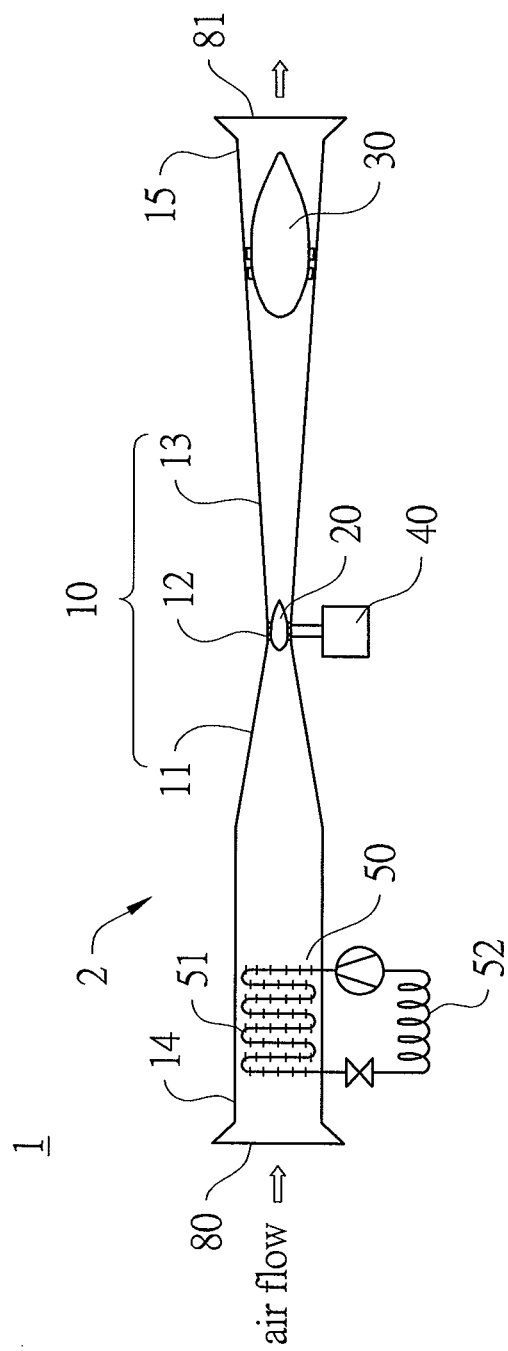
FIG. 1C is a sectional view of another embodiment of single energy generation unit open loop system of the present invention.

Please refer to FIG. 1C, which is a sectional view of another embodiment of single energy generation unit open loop system of the present invention. The structure is basically the same as the embodiment shown in FIG. 1A, except that the air/gas compressor 30 is located in the diffuser section 13. The air/gas compressor 30 compresses the air/gas nearby the air/gas compressor 30 such that the air/gas inside the wind tunnel 10 starts flowing along the direction from the tunnel contraction end 14 to the tunnel diffuser end 15. The at least one heating device 50 preheats the air/gas flowing through the at least one heating device 50. And then the air/gas flows through the air/gas turbine 20, the air/gas turbine 20 is driven to rotate. Since the generator 40 is coupled to the air/gas turbine 20, the generator 40 is driven to generate electricity.

Figure 2A:
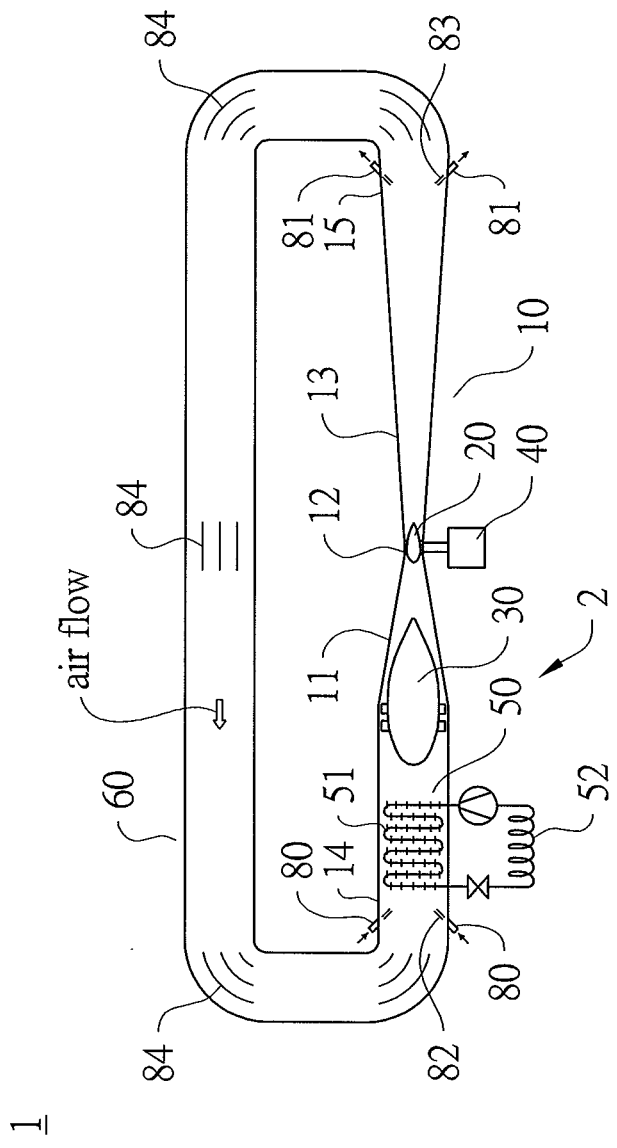
FIG. 2A is a sectional view of an alternate embodiment of single energy generation unit closed loop system of the present invention.

Please refer to FIG. 2A, which is a sectional view of an alternate embodiment of single energy generation unit closed loop system of the present invention. The clean energy generation system 1 comprises one energy generation unit 2 and a connecting tube 60. The structure of the energy generation unit 2 is basically the same as the embodiment shown in FIG. 1A. The connecting tube 60 has two ends. Two ends of the connecting tube 60 are connected to the tunnel contraction end 14 and the tunnel diffuser end 15 respectively so as to form a single energy generation unit (single-unit) closed loop system.

The clean energy generation system 1 may further comprise at least one internal guide vane 84, each of which is disposed at the contraction section 11, the diffusion section 13 or the connecting tube 60. The internal guide vane 84 may be programmed to control to guide the air/gas inside the wind tunnel 10 or the connecting tube 60 for smoothing the air/gas flows in the wind tunnel 10 or the connecting tube 60.

The connecting tube 60 may be provided with at least one thermal insulating layer for preventing heat dissipation. Or the connecting tube 60 may be made of thermal insulating material for preventing heat dissipation. Or the connecting tube 60 may be provided with at least one thermal insulating layer and may be made of thermal insulating material for preventing heat dissipation.

Figure 2B:
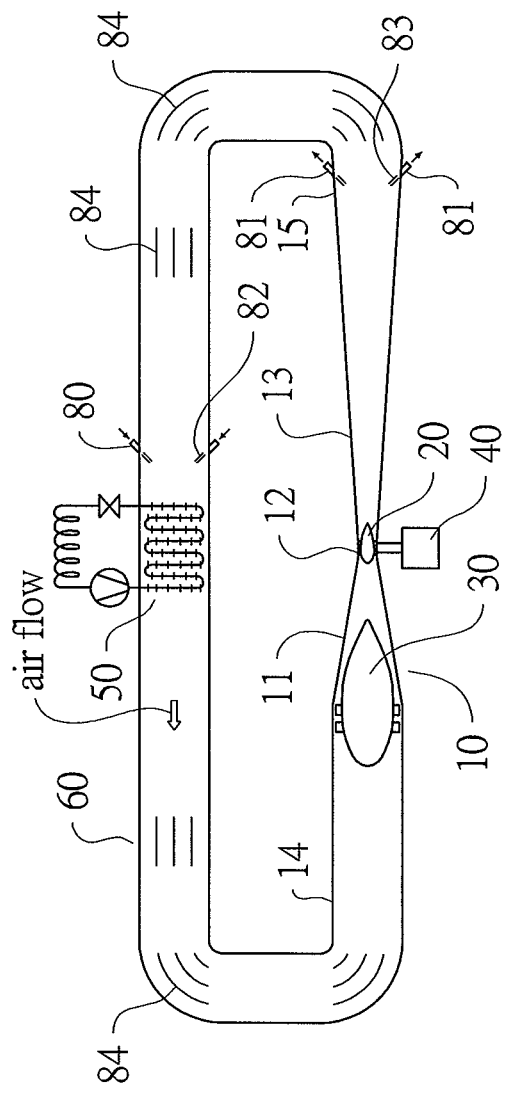
FIG. 2B is a sectional view of an alternate embodiment of single energy generation unit closed loop system of the present invention.

Please refer to FIG. 2B, which is a sectional view of an alternate embodiment of single energy generation unit closed loop system of the present invention. The structure is basically the same as the embodiment shown in FIG. 2A, except that the at least one heating device 50 is located in the connecting tube 60.

Each of the at least one heating device 50 has a heat sink 51. The heat sink 51 may be located in the contraction section 11 or the connecting tube 60.

The clean energy generation system 1 may further comprise at least one air/gas inlet valve 80, each of which is disposed at the tunnel contraction end 14 or the connecting tube 60. The air/gas inlet valve 80 is controlled for air/gas inflowing. The air/gas inlet valve 80 may be programmed to control to let the ambient air/gas flow into the wind tunnel 10 or in the connecting tube 60. The air/gas filter may be provided in the air/gas inlet valve 80 for preventing the clean energy generation system 1 from the pollution of the dust. The humidity controlled may be provided in the air/gas inlet valve 80 for controlling the humidity of the air/gas flowing in the clean energy generation system.

The clean energy generation system 1 may further comprise at least one inlet guide vane 82, each of which is disposed at the tunnel contraction end 14 or the connecting tube 60. The inlet guide vane 82 may be programmed to control for steering air/gas inflowing. When the air/gas inlet valve 80 is opened, the inlet guide vane 82 may be programmed to control to guide the ambient air/gas flow into the clean energy generation system 1.

Figure 2C:
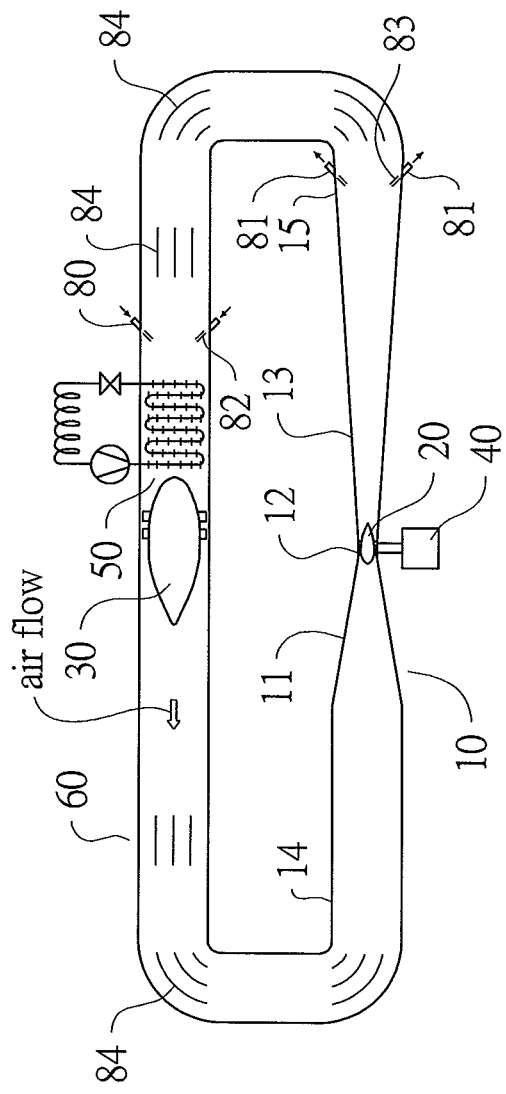
FIG. 2C is a sectional view of an alternate embodiment of single energy generation unit closed loop system of the present invention.

Please refer to FIG. 2C, which is a sectional view of an alternate embodiment of single energy generation unit closed loop system of the present invention. The structure is basically the same as the embodiment shown in FIG. 2B, except that the air/gas compressor 30 is located in the connecting tube 60.

Please refer to FIGS. 2A, 2B and 2C. The at least one heating device 50 is located in the contraction section 11 or in the connecting tube 60; the air/gas compressor 30 is located in the contraction section 11 or in the connecting tube 60; and the air/gas compressor 30 is between the at least one heating device 50 and the air/gas turbine 20 such that the air/gas is firstly preheated by the at least one heating device 50 and secondly compressed by the air/gas compressor 30, and then the air/gas flows through the air/gas turbine 20 and drives the air/gas turbine 20 so as to drive the generator 40 to generate electricity.

Figure 3A:
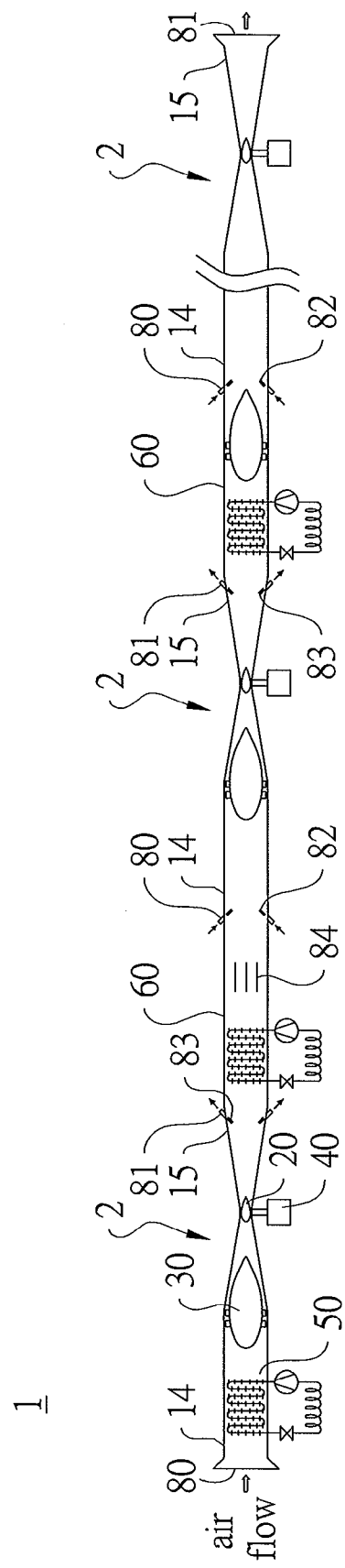
FIG. 3A is a sectional view of another embodiment of plural energy generation units open loop system of the present invention.

Please refer to FIG. 3A, which is a sectional view of another embodiment of plural energy generation units open loop system of the present invention. The clean energy generation system 1 comprises plural energy generation units 2 and at least one connecting tube 60. The structure of each of the plural energy generation units 2 is basically the same as the embodiment shown in FIG. 1A. And the structure of each of the at least one connecting tube 60 is basically the same as the embodiment shown in FIG. 2A. The number of the plural energy generation units 2 is one more than the number of the at least one connecting tube 60. The plural energy generation units 2 are arranged in an open loop so as to form a plural energy generation units (multiple-unit) open loop system, wherein between every two adjacent energy generation units 2 one of the connecting tube 60 is inserted and two ends of the connecting tube 60 are connected respectively to the tunnel diffuser end 15 of one energy generation unit 2 and to the tunnel contraction end 14 of the other energy generation unit 2.

The at least one heating device 50 is located in the contraction section 11 or in the connecting tube 60; the air/gas compressor 30 is located in the contraction section 11 or in the connecting tube 60; and the air/gas compressor 30 is between the at least one heating device 50 and the air/gas turbine 20 such that the air/gas is firstly preheated by the at least one heating device 50 and secondly compressed by the air/gas compressor 30, and then the air/gas flows through the air/gas turbine 20 and drives the air/gas turbine 20 so as to drive the generator 40 to generate electricity.

Each of the at least one heating device 50 has a heat sink 51. The heat sink 51 may be located in the contraction section 11 or the connecting tube 60.

The clean energy generation system 1 may further comprise at least one air/gas inlet valve 80, each of which is disposed at the tunnel contraction end 14 or the connecting tube 60. The air/gas inlet valve 80 is controlled for air/gas inflowing. The air/gas inlet valve 80 may be programmed to control to let the ambient air/gas flow into the wind tunnel 10 or in the connecting tube 60. The air/gas filter may be provided in the air/gas inlet valve 80 for preventing the clean energy generation system 1 from the pollution of the dust. The humidity controlled may be provided in the air/gas inlet valve 80 for controlling the humidity of the air/gas flowing in the clean energy generation system.

The clean energy generation system 1 may further comprise at least one inlet guide vane 82, each of which is disposed at the tunnel contraction end 14 or the connecting tube 60. The inlet guide vane 82 may be programmed to control for steering air/gas inflowing. When the air/gas inlet valve 80 is opened, the inlet guide vane 82 may be programmed to control to guide the ambient air/gas flow into the clean energy generation system 1.

The clean energy generation system 1 may further comprise at least one internal guide vane 84, each of which is disposed at the contraction section 11, the diffusion section 13 or the connecting tube 60. The internal guide vane 84 may be programmed to control to guide the air/gas inside the wind tunnel 10 or the connecting tube 60 for smoothing the air/gas flows in the wind tunnel 10 or the connecting tube 60.

Figure 3B:
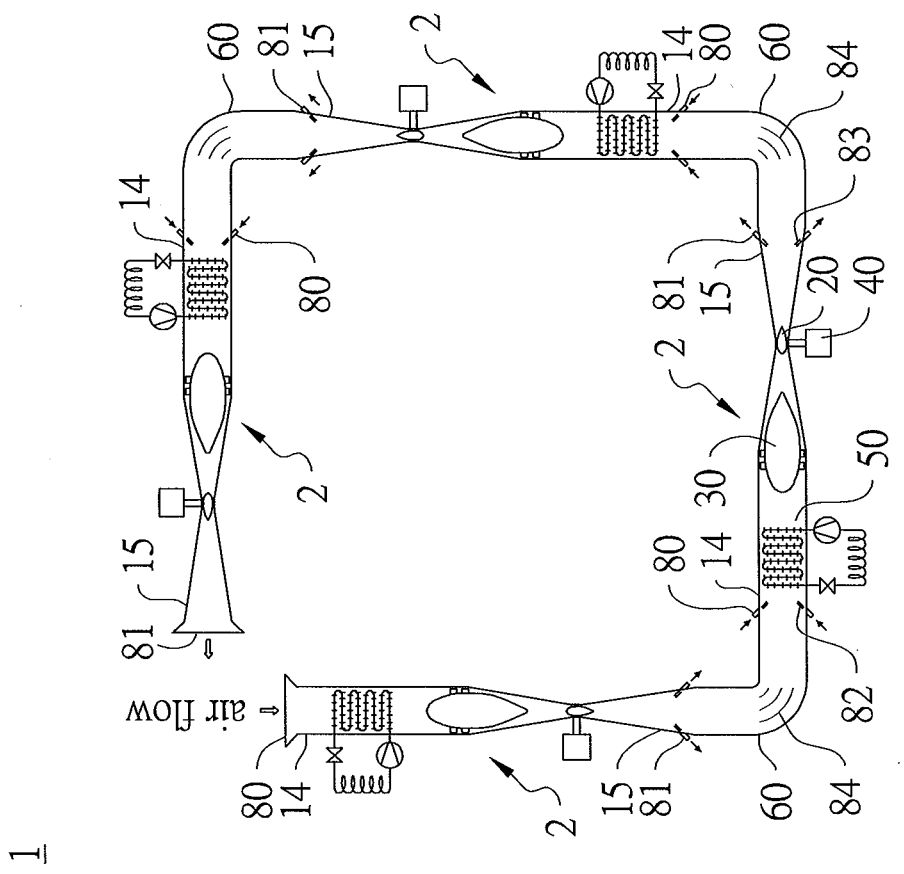
FIG. 3B is a sectional view of an alternate embodiment of plural energy generation units open loop system of the present invention.

Please refer to FIG. 3B, which is a sectional view of an alternate embodiment of plural energy generation units open loop system of the present invention. The structure is basically the same as the embodiment shown in FIG. 3A, except that the clean energy generation system 1 is comprised by four energy generation units 2 and three connecting tubes 60 and the contour of the clean energy generation system 1 has different shape as the embodiment shown in FIG. 3A. The clean energy generation system 1 is also a plural energy generation units (multi-unit) open loop system.

Figure 4:
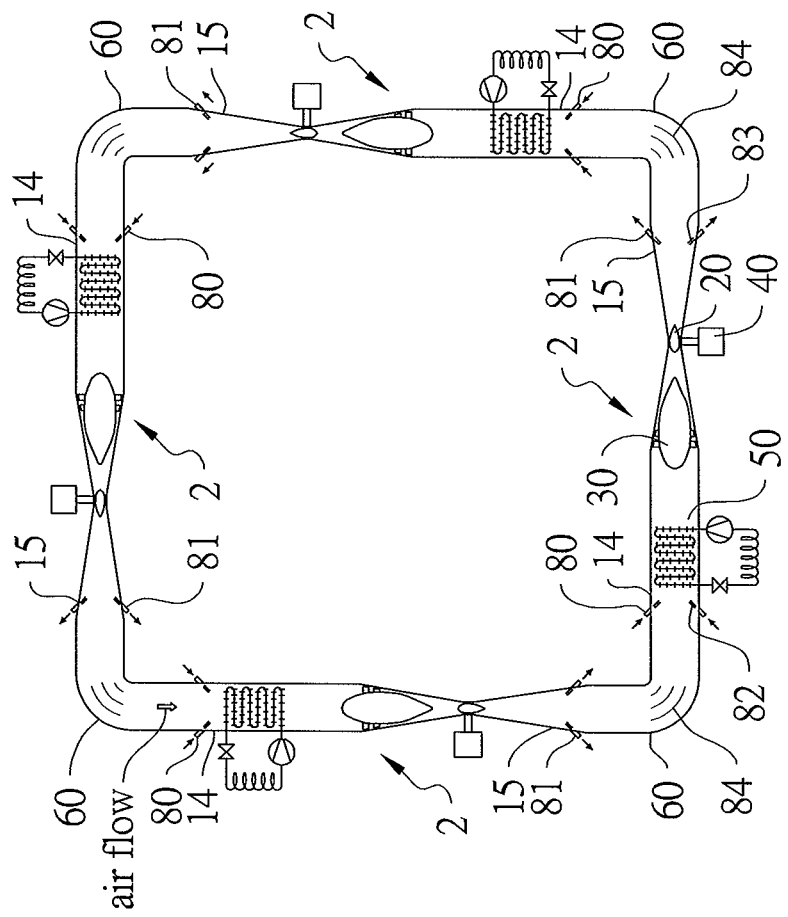
FIG. 4 is a sectional view of an alternate embodiment of plural energy generation units closed loop system of the present invention.

Please refer to FIG. 4, which is a sectional view of an alternate embodiment of plural energy generation units closed loop system of the present invention. The structure is basically the same as the embodiment shown in FIG. 3B, except that the clean energy generation system 1 comprises one more connecting tubes 60 than the embodiment shown in FIG. 3B. The clean energy generation system 1 is comprised by four energy generation units 2 and four connecting tubes 60 so as to form a plural energy generation units (multi-unit) closed loop system.

The clean energy generation system 1 may comprise 2, 3, 4, 5, 6, 7, 8, 9 or 10 of the energy generation units 2. Actually the amount of the energy generation units is up to the application.

Please refer to FIG. 3A. It unveils a renewable power generation system using the clean energy generation system 1 working process that transforms the heat from heat pumps, air/gas compressor work, and internal friction loss into useful air/gas turbine output work. This is a series of identical combinations of each of the at least one heating device 50, the air/gas compressor 30, and the air/gas turbine 20 arranged in tandem. Each air/gas compressor 30, located at downstream of the preceding the air/gas turbine 20, extracts air/gas from the air/gas turbine 20 thus produces negative pressure and causes sharply pressure drop at the air/gas turbine 20 exit. The air/gas turbine 20 output work ($W_{tb}$) is proportional to the temperature difference ($\Delta T_{34}=T_3-T_4$) of the air/gas turbine 20 inlet air/gas temperature ($T_3$) and the air/gas turbine 20 outlet air/gas temperature ($T_4$), which varies exponentially with the air/gas turbine pressure ratio ($P_3/P_4$, usually 2~15) of the air/gas turbine 20 inlet air/gas pressure ($P_3$) to the air/gas turbine 20 outlet air/gas pressure ($P_4$) in adiabatic process as below:

$$W_{tb} = MC_P(T_3 - T_4) = MC_P T_3 \left(1 - \left(\frac{P_4}{P_3}\right)^{(1-\frac{1}{k})}\right),$$

$$\text{where } T_4 = T_3 \left(\frac{P_4}{P_3}\right)^{(1-\frac{1}{k})},$$

M=mass flow rate of the air/gas, $$k = \frac{C_P}{C_V} = 1.4,$$

$C_P$ & $C_V$=constant pressure/volume specific heat capacities of the air/gas.

Please refer to the ASME paper: "Operational Behavior of a Complex Transonic Test Turbine facility" (by F. Neumayer, etc., Institute for Thermal Turbomachinery & Machines Dynamics, Graz University of Technology, Austria; ASME paper 2001-GT-489, TURBO EXPO 2001). As the ASME paper reports that a suction blower put at the air turbine exit reducing back pressure of 200 mbar can increase the air turbine inlet/outlet air pressure ratio by 25% thus $W_{tb}$ becomes more than those gas turbines without such blower as ($\Delta T_{34}=T_3-T_4$) becomes larger. Based on the same principle, the clean energy generation system 1 as shown in FIG. 3A can work effectively to produce useful output electric power. Each air/gas compressor 30 works efficiently to reduce air/gas pressure of preceding turbine outlet, because it extracts more air/gas from the air/gas turbine 20 than the blower as mentioned in the ASME paper, because the air/gas compressors 30 are of higher compression ratio than blowers. Thus, such design gives higher air/gas turbine pressure ratio in the clean energy generation system 1 than conventional gas turbines without blowers/compressors to produce suction pressure at turbine exit. Therefore, the clean energy generation system 1 of higher turbine air/gas expansion ratio $P_3/P_4$ can achieve more air/gas turbine output work, as air/gas temperature at the air/gas turbine 20 exit drops more when $P_3/P_4$ becomes larger.

Heat pump is an energy-efficient device to move heat from low-temperature source to high-temperature sink. This "moved" heat is used to heat up air/gas to offset the energy extracted by the air/gas turbine 20 from the clean energy generation system 1. The clean energy generation system 1 is fully thermally insulated and, thus theoretically of nearly zero heat loss, as it works adiabatically. The clean energy generation system 1 has higher energy density than most existing renewable energy generators.

The wind tunnel 10 is subsonic, atmospheric, continuous, closed loop type (or open loop type), of highest air/gas-flow velocity around Mach 0.6 to 0.8 at turbine inlet. Wind tunnel is thermally insulated to minimize heat loss (theoretically of nearly zero heat loss), it has air/gas inlet & outlet vent ports at each combination of the clean energy generation system 1 to maintain smooth air/gas stream at each combination.

The air/gas compressor 30 is multi-stage type, with moderate compression ratio & surge-protection. It is put as nearer turbine exit as possible. Thus, air/gas compressor powerfully & forcibly removes air/gas out from turbine end, and makes considerable pressure drop, simultaneously temperature descending, on air/gas-flow passing through the wind tunnel passage from turbine end to entry of air/gas compressor. The consumption work needed of the air/gas compressor 30 ($W_{CPS}$) is in proportion to its inlet/outlet air/gas temperature difference ($\Delta T_{12}$):

$$W_{CPS}=MC_P(T_2-T_1)=MC_P\Delta T_{12},$$

where
M: mass flow rate of air/gas-flow,
$C_P$: constant-pressure specific heat capacity of air/gas,
$T_2$: air/gas compressor outlet air/gas temperature,
$T_1$: air/gas compressor inlet air/gas temperature.

The air/gas turbine 20, a multi-stage turbine is adopted, as it works with higher efficiency. Air/gas-flow of highest air/gas-flow velocity is around Mach 0.6-0.8 at air/gas turbine inlet; this velocity will be increased to near sonic speed but should never be higher than Mach 1.0 to avoid "Choke" at turbine blades.

Comparison of Inlet/Outlet Air/gas Temperature differences of "Compressor" & "Turbine", $\Delta T_{12}$ vs. $\Delta T_{34}$: as an example, please refer to FIG. 4, the air/gas turbine outlet air/gas is extracted by the next air/gas compressor thus huge suction pressure removes more air/gas out from here and air/gas pressure at turbine exit drops sharply. The air/gas turbine 20 output work $W_{tb}$ is proportional to temperature difference $\Delta T_{34}$, which varies exponentially with the air/gas turbine inlet/outlet air/gas pressure ratio $P_3/P_4$ in in adiabatic process, i.e.:

$$W_{tb} = MC_P(T_3 - T_4) = MC_P T_3 \left(1 - \left(\frac{P_4}{P_3}\right)^{(1-\frac{1}{k})}\right),$$

$$\text{where } T_4 = T_3 \left(\frac{P_4}{P_3}\right)^{(1-\frac{1}{k})},$$

M=mass flow rate of the air/gas, $$k = \frac{C_P}{C_V} = 1.4,$$

$C_P$ & $C_V$=constant pressure/volume specific heat capacities of the air/gas.

As the ASME paper reports that a suction blower put at the air/gas turbine exit reducing back pressure of 200 mbar can increase the air/gas turbine inlet/outlet air/gas pressure ratio by 25% thus Wtb becomes more than those gas turbines without such blower as ($\Delta T_{34}=T_3-T_4$) becomes larger. Similarly, it is done by the clean energy generation system 1. Each air/gas compressor works efficiently to reduce turbine outlet air/gas pressure because it extracts more air/gas from turbine than the blower mentioned in ASME paper, as it is of higher compression ratio or more powerful than blower. Thus, such design gives higher turbine pressure ratio to the clean energy generation system than conventional gas turbines without blowers or compressors producing suction pressure at turbine exit. Therefore, the clean energy generation system of higher turbine pressure ratio can achieve more turbine output work, Because that air/gas temperature at turbine exit drops more, i.e. $\Delta T_{34}$ becomes larger as:
where $$T_4 = T_3 \left(\frac{P_4}{P_3}\right)^{(1-\frac{1}{k})}$$

Consequently, counting in all of these, we conclude:

$$\Delta T_{34} > \Delta T_{12}$$

In the clean energy generation system 1, this consequence results in that power produced by the air/gas turbine $W_{tb}$:

$$W_{tb} = MC_P \Delta T_{34}$$

is more than power consumed by the air/gas compressor $W_{CPS}$:

$$W_{CPS} = MC_P \Delta T_{12}$$

Thus, $$W_{tb} > W_{CPS}.$$

Of course, the additional energy in turbine comes from heat pump in roughly speaking to neglect friction loss & heat loss, i.e.

$$Q_{HP} = W_{tb} - W_{CPS} \text{(neglect friction loss \& heat loss)},$$

where $Q_{HP}$ is the heat supplied by heat pump to the clean energy generation system 1.

Further details will be discussed later.

Figure 5:
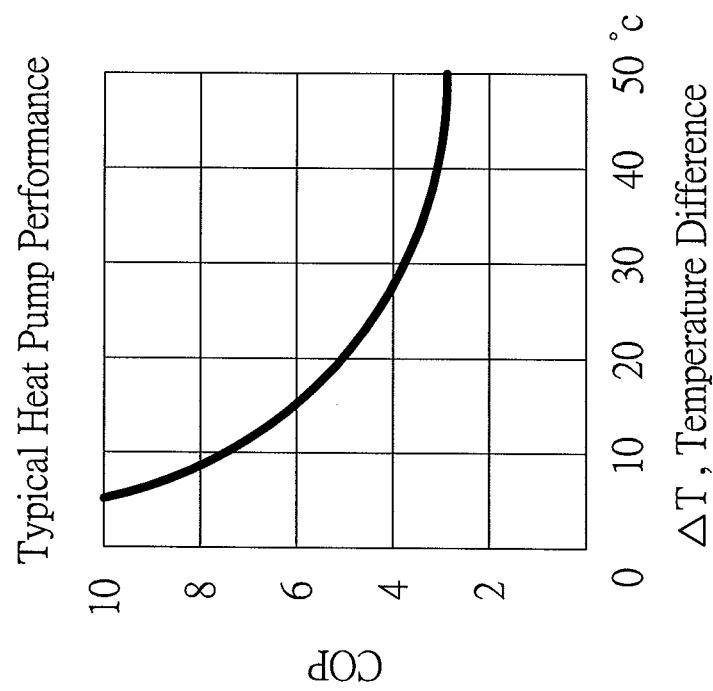
FIG. 5 is the typical heat pump performance curve.

The heat pump uses reversed Carnot cycle, only works in heating mode in the clean energy generation system 1. Inside wind tunnel, airfoil-cross-section-shaped "fin-tube" radiator (it is a part of the condenser of heat pump, as shown in FIG. 1B.) is required to reduce air resistance as the airspeed here is high. Please refer to FIG. 5, which is the typical heat pump performance curve: the coefficient of performance of the heat pump (COP, in heating cycle only) vs. $\Delta T$ is shown in FIG. 5. $\Delta T$, usually called "Temperature Lift", is the temperature difference between heat sources & heat sinks of heat pumps. It is the most important parameter for heat pumps. The higher temperature lift, the lower COP value, and vice verse.

The generator 40 is driven by air/gas turbine and produces electric power, which is nearly same as turbine output.

The clean energy generation system makes use of heat energy supplied by the following sources to generate electric power:
  1) heat supplied by heat pumps from external heat source, such as ambient air or geothermal heat;
  2) heat transformed from air/gas compressor work in the system itself; and
  3) waste heat caused by friction loss due to internal resistance in the system itself.

For each combination in the clean energy generation system, Heat Loss=0 for adiabatic process.
Assume that Net Friction Loss=0.2 $W_{CPS}$, and the consumption work of the heat pump $W_{HP}$=0.15$W_{CPS}$, COP=4.
Thus, $Q_{HP}$=4$W_{HP}$=0.6$W_{CPS}$. (As only small portion of total friction loss is really lost. Most of it is converted into heat and becomes useful work in the clean energy generation working cycles. Further details will be discussed later.)

$$W_{tb} = W_{CPS} + Q_{HP} - \text{Net Friction Loss} - \text{Heat Loss} \cong$$

$$W_{CPS} + 0.6 W_{CPS} - 0.2 W_{CPS} = 1.4 W_{CPS}$$

The useful output work from a single energy generation unit:

$$W_{useful} = W_{tb} - (W_{CPS} + W_{HP}) = (1.4 - (1 + 0.15))$$
$$W_{CPS} = 0.25 W_{CPS}$$

Thus, the clean energy generation system 1 comprises n energy generation units, the total useful output work for the clean energy generation system will be:

$$\sum_n W_{useful} = n W_{useful} = 0.25 n W_{CPS}$$

$$\text{Energy Efficiency} = \frac{W_{useful}}{\text{Input Energy}} = \frac{W_{useful}}{W_{CPS} + W_{HP}} = \frac{0.25}{1 + 0.15} = 21.74\%$$

The following working examples please refer to FIG. 2A/2B/2C/3A/3B/4.

Working Example 1

Compression Ratio $P_2/P_1$=2, Expansion Ratio $P_3/P_4$=3

A. At Compressor Section:

Assume: 1. Heat pump heats up the air/gas-flow at upstream of air/gas compressor from 10° C. to 35° C. (=10° C.+25° C. temp. lift, the heat source may be ambient air/gas or shallow geothermal heat source of about 50 m depth.), thus $T_1$=35° C.=308K Assume: 2. Compression ratio of air/gas compressor:

$$\frac{P_2}{P_1} = 2, \text{ thus}$$

$$T_2 = T_1 \left(\frac{P_2}{P_1}\right)^{\left(1-\frac{1}{1.4}\right)} = T_1(2)^{\left(\frac{2}{7}\right)} = 308\text{ K} * 1.219 = 375.5\text{ K} = 102.5° \text{ C.}$$

Inlet/Outlet air/gas temperature difference:

$$\Delta T_{12} = T_2 - T_1 = 375.5\text{K} - 308\text{K} = 67.5\text{K}$$

Thus, $W_{CPS} = MC_P \Delta T_{12} = 67.5 MC_P$

B. At Turbine Section:

Assume expansion ratio $$\frac{P_3}{P_4}$$

is enlarged from 2 to 3, caused by huge suction pressure from the compressor of the next combination at downstream in tandem, thus:

$$\frac{P_4}{P_3} = \frac{1}{3}$$

as $T_3 = T_2 = 375.5$ K = 102.5° C., thus, $$T_4 = T_3 \left(\frac{P_4}{P_3}\right)^{\left(1-\frac{1}{1.4}\right)} = T_3 \left(\frac{1}{3}\right)^{\left(\frac{2}{7}\right)} = 375.5\text{ K} * 0.730 = 274.1\text{ K} = 1.1° \text{ C.}$$

$$\Delta T_{34} = T_3 - T_4 = 375.5\text{ K} - 274.1\text{ K} = 101.4\text{ K}$$

Thus, $W_{tb} = MC_P \Delta T_{34} = 101.4 MC_P = 101.4 * \dfrac{W_{CPS}}{67.5} = 1.502 W_{CPS}$ $W_{useful} = W_{tb} - (W_{CPS} + W_{HP}) = (1.502 - (1 + 0.15)) W_{CPS} = 0.352 W_{CPS}$ $$\text{Energy Efficiency} = \frac{W_{useful}}{\text{Input Energy}} = \frac{W_{useful}}{W_{CPS} + W_{HP}} = \frac{0.352}{1 + 0.15} = 30.60\%$$

Working Example 2

Compression Ratio $P_2/P_1=3$, Expansion Ratio $P_3/P_4=6$

A. At Compressor Section:

Assume: 1. Heat pump heats up the air/gas-flow at upstream of air/gas compressor from 35° C. to 60° C. (=35° C.+25° C. temp. lift, this may come from geothermal heat source at about 800 m depth.), thus $T_1=60°$ C.$=333K$ Assume: 2. Compression ratio of air/gas compressor:

$$\frac{P_2}{P_1} = 3, \text{ thus}$$

$$T_2 = T_1\left(\frac{P_2}{P_1}\right)^{\left(1-\frac{1}{1.4}\right)} = T_1(3)^{\left(\frac{2}{7}\right)} = 333 \text{ K} = 1.369 = 455.9 \text{ K} = 182.9° \text{ C.}$$

Inlet/Outlet air/gas temperature difference:

$$\Delta T_{12} = T_2 - T_1 = 455.9K - 333K = 122.9K$$

Thus, $W_{CPS} = MC_P \Delta T_{12} = 122.9 MC_P$

B. At Turbine Section:

Assume expansion ratio $$\frac{P_3}{P_4}$$

is enlarged from 3 to 6, caused by huge suction pressure from the compressor of the next combination at downstream in tandem, thus:

$$\frac{P_4}{P_3} = \frac{1}{6}$$

as $T_3 = T_2 = 455.9$ K $= 182.9°$ C., thus, $$T_4 = T_3\left(\frac{P_4}{P_3}\right)^{\left(1-\frac{1}{1.4}\right)} = T_3\left(\frac{1}{6}\right)^{\left(\frac{2}{7}\right)} = 375.5 \text{ K} * 0.599 = 273.1 \text{ K} = 0.1° \text{ C.}$$

$$\Delta T_{34} = T_3 - T_4 = 455.9 \text{ K} - 273.1 \text{ K} = 182.8 \text{ K}$$

Thus, $W_{tb} = MC_P \Delta T_{34} = 182.8 MC_P = 182.8 * \frac{W_{CPS}}{122.9} = 1.487 W_{CPS}$ $W_{useful} = W_{tb} - (W_{CPS} + W_{HP}) = (1.487 - (1 + 0.15))W_{CPS} = 0.337 W_{CPS}$ Energy Efficiency $= \frac{W_{useful}}{\text{Input Energy}} = \frac{W_{useful}}{W_{CPS} + W_{HP}} = \frac{0.337}{1 + 0.15} = 29.30\%$

Working Example 3

Compression Ratio $P_2/P_1=5$, Expansion Ratio $P_3/P_4=13$

A. At Compressor Section:

Assume: 1. Heat pump heats up the air/gas-flow at upstream of air/gas compressor from 60° C. to 85° C. (=60° C.+25° C. temp. lift, this may come from geothermal heat source of moderately deep type at about 1500 m depth.), thus $T_1=85°$ C.$=358K$ Assume: 2. Compression ratio of air/gas compressor:

$$\frac{P_2}{P_1} = 5, \text{ thus}$$

$$T_2 = T_1\left(\frac{P_2}{P_1}\right)^{\left(1-\frac{1}{1.4}\right)} = T_1(5)^{\left(\frac{2}{7}\right)} = 358 \text{ K} * 1.585 = 567.4 \text{ K} = 294.4° \text{ C.}$$

Inlet/Outlet air/gas temperature difference:

$$\Delta T_{12} = T_2 - T_1 = 567.4K - 358K = 209.4K$$

Thus, $W_{CPS} = MC_P \Delta T_{12} = 209.4 MC_P$

B. At Turbine Section:

Assume expansion ratio $$\frac{P_3}{P_4}$$

is enlarged from 6 to 13, caused by huge suction pressure from the compressor of the next combination at downstream in tandem, thus:

$$\frac{P_4}{P_3} = \frac{1}{13}$$

as $T_3 = T_2 = 567.4$ K $= 294.4°$ C., thus, $$T_4 = T_3\left(\frac{P_4}{P_3}\right)^{\left(1-\frac{1}{1.4}\right)} = T_3\left(\frac{1}{13}\right)^{\left(\frac{2}{7}\right)} = 567.4 \text{ K} * 0.480 = 272.4 \text{ K} = -0.6° \text{ C.}$$

$$\Delta T_{34} = T_3 - T_4 = 567.4 \text{ K} - 272.4 \text{ K} = 295.0 \text{ K}$$

Thus, $W_{tb} = MC_P \Delta T_{34} = 295.0 MC_P = 295.0 * \frac{W_{CPS}}{209.4} = 1.409 W_{CPS}$ $W_{useful} = W_{tb} - (W_{CPS} + W_{HP}) = (1.409 - (1 + 0.15))W_{CPS} = 0.259 W_{CPS}$ Energy Efficiency $= \frac{W_{useful}}{\text{Input Energy}} = \frac{W_{useful}}{W_{CPS} + W_{HP}} = \frac{0.259}{1 + 0.15} = 22.52\%$ The internal resistance loss (Friction Loss $W_{ir}$) is caused by various resistances at wind tunnel duct, heat pump's condenser radiators & corner guide vanes, etc. It is classified as "Friction Loss" & "Dynamic Loss", both cause air/gas-flow boundary layer separations & turbulences. Friction loss is caused by frictions of wind tunnel skin & air/gas-flow boundary layers, and frictions of air/gas molecules of "laminar flows" of different velocities. It occurs everywhere and overall interior of wind tunnel. Dynamic loss is caused by those particular objects in wind tunnel, which change air/gas-flow speeds & directions, eg. corner guide vanes, it is calculated individually.

All resistance/friction losses are transformed into heat, thus, air/gas-flow is being consistently heated up. For conventional wind tunnels, air/gas-flow becomes warm & finally hot, needs cooling down at all times by a cooling system. In other words, all heat incurred by wind tunnel internal resistance is eventually transformed into internal energy of air/gas in terms of temperature rise. Therefore, for conventional wind tunnels, energy of "Resistance Loss" taken out by cooling system is entirely lost or wasted. For conventional wind tunnels, it consumes about half of compressor work or less:

$$\Sigma W_{ir} < 0.5 W_{CPS}$$

Net internal resistance factor $f_R$ is introduced for the clean energy generation system 1:

$$f_R = \frac{NetW_{ir}}{W_{CPS}}$$

where $f_R$ is the ratio of "net consumption work of internal resistance" to "Wind tunnel air/gas compressor work".

In the clean energy generation system, the wind tunnel, internal resistance is something like "Storm in a Teapot" because wind tunnel is closed, fully thermally insulated, so heat loss is minimized to nearly zero, i.e. most energy of this "resistance loss" never goes out & is almost entirely kept in wind tunnel to heat up the air/gas eventually for driving turbine. In other words, a portion of it is collected, recovered by turbine and transformed into useful turbine work in each cycle to generate power, and the rest is still remained in the system for the following cycles. Thus, a concept of "Net Resistance Loss" should be established for the clean energy generation system, distinguishes same for conventional wind tunnels because these two kinds of wind tunnels are working in entirely different ways with "resistance in wind tunnel":
For conventional wind tunnels:

Net Resistance Loss (Net$W_{ir}$)=Sum of All Resistance Losses ($\Sigma W_{ir}$)

Thus, Net$W_{ir}$=$\Sigma W_{ir}$<0.5$W_{CPS}$, as $W_{CPS}$=$\Sigma W_{ir}$+$Q_{cl}$, where $Q_{cl}$ is "Heat Loss" (This is "Cooling Loss" in conventional wind tunnels).
For the clean energy generation system:

Net$W_{ir}$<<$\Sigma W_{ir}$ (As the resistance is consistently transformed into useful work.)
We assume it consumes 20% of air/gas compressor power, $f_R$=0.2 thus:

Net Friction & Resistance Loss=0.2$W_{CPS}$

This reveals: "Net Resistance Loss" in this system is much less than that in conventional wind tunnels. Therefore, net resistance loss of this system is "actually smaller". Accurate data will be obtained by precise experiments.

"Heat Loss" ($Q_{cl}$) (This is "Cooling Loss" in conventional wind tunnels) is the sum of heat removed by cooling system and heat dissipating out from the system. For conventional wind tunnels, this is certainly a huge amount of energy loss, makes the wind tunnel operational cost extremely high. For each wind tunnel, compressor delivers hot air/gas, and simultaneously internal resistance heats up the air/gas. Under these two effects, the air/gas in wind tunnel becomes too hot to be used for model study in the test section. So large capacity cooling system must be used to cool down the air/gas and takes away the troublesome heat at all times.

For conventional wind tunnels, cooling loss consumes half of compressor power or more. Thus, $Q_{cl}$>0.5$W_{CPS}$. For the clean energy generation system, it is fully thermally insulated and assumed to be working in adiabatic process, thus, $Q_{cl}$=0.

For example, we refer to Aircraft Research Association Limited (ARA)'s Continuous Transonic Wind Tunnel at Bedford, UK. Its air compressor power is 21,200 hp, whilst the cooling compressor consumes power of 9,900 hp. We estimate its cooling loss here is twice the cooling compressor power, i.e. 19,800 hp or the cooling loss is about 93.4% of wind tunnel air compressor power. That is really huge energy loss! (Please refer to page 430 of the report "Wind Tunnels of The Eastern Hemisphere" by Federal Research Div., Library of U.S. Congress for NASA, Aug. 2008)

Figures 6A, 6B:
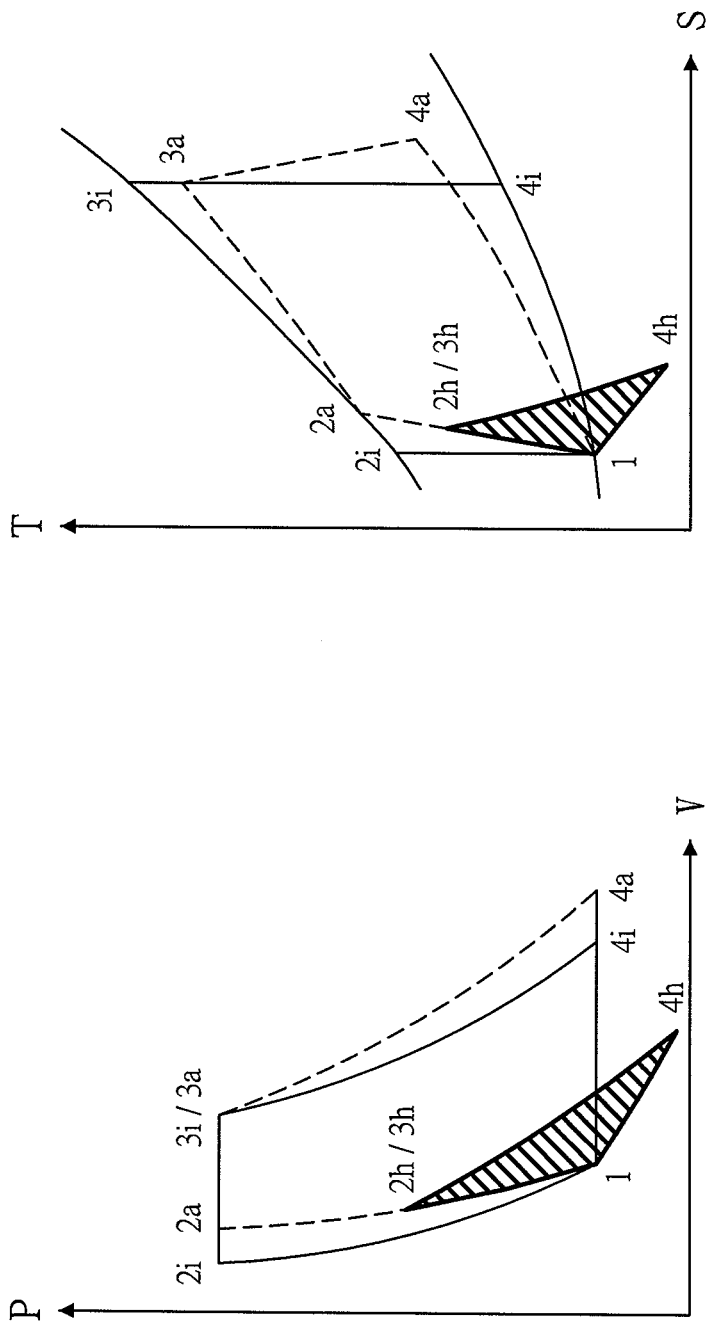
FIG. 6A is the Pressure-Volume (P-V) diagram of the comparison with the ideal Brayton cycle, the actual gas turbine cycle and the clean energy generation system cycle of the present invention.
FIG. 6B is the Temperature-Entropy (T-S) diagram of the comparison with the ideal Brayton cycle, the actual gas turbine cycle and the clean energy generation system cycle of the present invention.

Please refer to FIG. 6A, which is the Pressure-Volume (P-V) diagram of the comparison with the ideal Brayton cycle, the actual gas turbine cycle and the clean energy generation system cycle of the present invention. And also please refer to FIG. 6B, which is the Temperature-Entropy (T-S) diagram of the comparison with the ideal Brayton cycle, the actual gas turbine cycle and the clean energy generation system cycle of the present invention.

| | |
|---|---|
| Ideal Brayton Cycle | 1-2i-3i-4i-1 |
| Actual Gas Turbine Cycle | 1-2a-3a-4a-1 |
| Clean Energy Generation System Cycle (The present invention) | 1-2h/3h-4h-1 |

1-2: Compressor working for the three cycles;
2-3: Combustion in ideal Brayton & AGT cycles (not available for the clean energy generation cycle);
3-4: Turbine working for the three cycles;
4-1: Exhaust Air/gas Outlet & Ambient Air/gas Inlet for ideal Brayton cycle & AGT cycle; Air/gas heating process by heat pump for the clean energy generation cycle, as temperature & pressure drop to the lowest point caused by negative pressure produced by compressor of the next combination.

In FIG. 4, each air/gas compressor of the square clean energy generation system forcibly extracts air/gas from its preceding turbine, this makes air/gas pressure drop (i.e. negative pressure) sharply at the turbine exit (i.e.: "3h-4h-1" path in P-V & T-S diagrams). This lower air/gas pressure causes air/gas temperature descending more at same place which obeys the equation for adiabatic process as below:

$$T_4 = T_3 \left(\frac{P_4}{P_3}\right)^{(1-\frac{1}{k})}$$

thus, meanwhile, the air/gas passing through this section requires to be heated up for the next operation. Therefore, this "4h-1"path is called" air/gas heating process by heat pump" that obtains heat supplied by heat pump from external heat source to offset the energy extracted from air/gas in the preceding turbine working section. In comparison, path "4i-1" or "4a-1" for ideal Brayton cycle & AGT goes through atmosphere outside the system, being less controllable for system integration.

Comparisons of Actual Gas Turbine(AGT) & the clean energy generation System (By Working Samples):

TABLE 1

| Description | Actual Gas Turbine (AGT) | Clean Energy Generation System (The present invention) |
|---|---|---|
| Fuel Cost, USD/MWh | 30-45(CCGT); 45-70(OCGT) *** | Zero** |
| $CO_2$ & Other GHG Emissions, kg/MWh | 340-400 (CCGT); 480-575 (OCGT) *** | Zero** |
| Capacity Factor, % | 20-60(CCGT); 10-20(OCGT) *** | >90** |
| Net Energy Efficiency, % | 52-60(CCGT); 35-42(OCGT) *** | 22.52-30.60** |
| Mass Flow Rate of Air/gas, kg/s | M | M (same as AGT) |
| At Turbine Inlet: Gas/Air Flow Temp., T3, ° C. | 1,000* (OCGT) | 294.4** |
| At Turbine Outlet: Gas/Air Flow Temp., T4, ° C. | 500* (OCGT) | −0.6** |

TABLE 1-continued

| Description | Actual Gas Turbine (AGT) | Clean Energy Generation System (The present invention) |
|---|---|---|
| Turbine Power: | $W_{AGT} = MC_{P.Gas}(1000 - 500)$ | $W_{tb} = MC_P (294.4 + 0.6)$ | where Cp.Gas is constant-pressure specific heat capacity of AGT gasflow,
Cp is the same of the clean energy generation system air flow:

$$C_{P.Gas} = 1.2 C_P$$

Ratio of Turbine Power of the Two Systems:

$$\frac{W_{AGT}}{W_{tb}} = 2.03$$

In conclusion, the clean energy generation system is a dispatchable power source, like nuclear/fossil fuel, so it is suitable for integrating grid power transmission. As it always works continuously without intermission, much better than wind/solar of intermittence.

Cost Comparisons of Various Power generation Technologies: (Estimated "levelized cost (LC)" of 2018, in 2011 $/MWh, for power plants entering service in 2018, based on U.S. EIA data)

TABLE 2

| Power Plant Type | Capacity factor, % | Capital LC | Fixed O&M | Variable O&M, & Fuel | Transmission Investment | Total Levelized Cost |
|---|---|---|---|---|---|---|
| Conventional Coal | 85 | 65.7 | 4.1 | 29.2 | 1.2 | 100.1 |
| Advanced Coal | 85 | 84.4 | 6.8 | 30.7 | 1.2 | 123.0 |
| Advanced Coal with CCS | 85 | 88.4 | 8.8 | 37.2 | 1.2 | 135.5 |
| Natural Gas-fired: Conventional Combined Cycle | 87 | 15.8 | 1.7 | 48.4 | 1.2 | 67.1 |
| Natural Gas-fired: Advanced Combined Cycle | 87 | 17.4 | 2.0 | 45.0 | 1.2 | 65.6 |
| Natural Gas-fired: Advanced CC with CCS | 87 | 34.0 | 4.1 | 54.1 | 1.2 | 93.4 |
| Natural Gas-fired: Conventional Combustion Turbine | 30 | 44.2 | 2.7 | 80.0 | 3.4 | 130.3 |
| Natural Gas-fired: Advanced Combustion Turbine | 30 | 30.4 | 2.6 | 68.2 | 3.4 | 104.6 |
| Advanced Nuclear | 90 | 83.4 | 11.6 | 12.3 | 1.1 | 108.4 |
| Geothermal | 92 | 76.2 | 12.0 | 0 | 1.4 | 89.6 |
| Biomass | 83 | 53.2 | 14.3 | 42.3 | 1.2 | 111.0 |
| Wind | 34 | 70.3 | 13.1 | 0 | 3.2 | 86.6 |
| Wind, offshore | 37 | 193.4 | 22.4 | 0 | 5.7 | 221.5 |
| Solar PV | 25 | 87* | 9.9 | 0 | 4.0 | 100.9* |
| Hydro | 52 | 78.1 | 4.1 | 6.1 | 2.0 | 90.3 |
| Clean Energy Generation System** (The present invention) | >90 | 50-60 | 7 | 0 | 3 | 60-70 |

To sum up, the present invention indeed can get its anticipatory object that is to provide the clean energy generation system with higher efficiency and less pollution and can be combined with the geothermal energy as the energy supply for generating electricity.

The description referred to the drawings stated above is only for the preferred embodiments of the present invention. Many equivalent local variations and modifications can still be made by those skilled at the field related with the present invention and do not depart from the spirits of the present invention, so they should be regarded to fall into the scope defined by the appended claims.

What is claimed is:

1. A clean energy generation system, comprising at least one energy generation unit, each of which comprises:
    a wind tunnel, including a contraction section, a test section and a diffuser section; said contraction section, said test section and said diffuser section are arranged in tandem; and said test section is connected to said contraction section and said diffuser section respectively; wherein said wind tunnel has a tunnel contraction end and a tunnel diffuser end;
    an air/gas turbine, located in said test section or said diffuser section;
    a generator, coupled to said air/gas turbine;
    at least one heating device, for preheating the air/gas flowing through said at least one heating device; wherein said at least one heating device is located in said contraction section, wherein each of said at least one heating device is a heat pump, wherein said heat pump includes a heat source and a heat sink, wherein said heat source is disposed outside of said wind tunnel, wherein said heat sink is located in said contraction section or in said connecting tube, wherein said heat source delivers the heat of ambient air/gas or geothermal heat to the destination that is said heat sink, such that said heat sink has the energy to preheat the air/gas flowing through said heat sink; and
    an air/gas compressor, for compressing the air/gas flowing through said air/gas compressor, wherein said air/gas compressor is located in said contraction section, and said air/gas compressor is: (1) between said at least one heating device and said air/gas turbine or (2) located in said diffuser section;
    wherein said air/gas turbine is driven by the preheated and compressed said air/gas such that said generator is driven to generate electricity;
    wherein the power produced by said air/gas turbine is more than the sum of the power consumed by said air/gas compressor, the power consumed by said heat pump and the power of net friction loss.

2. The clean energy generation system according to claim 1, wherein said clean energy generation system comprises one energy generation unit and a connecting tube, and two ends of said connecting tube are connected respectively to said tunnel diffuser end and said tunnel contraction end of said energy generation unit so as to form a single-unit closed loop system.

3. The clean energy generation system according to claim 2, wherein said at least one heating device is located in said contraction section or in said connecting tube; said air/gas compressor is located in said contraction section or in said connecting tube; and said air/gas compressor is between said at least one heating device and said air/gas turbine such that the air/gas is firstly preheated by said at least one heating device and secondly compressed by said air/gas compressor, and then the air/gas flows through said air/gas turbine and drives said air/gas turbine so as to drive said generator to generate electricity; wherein said wind tunnel and said connecting tube are provided with at least one thermal insulating layer for preventing heat dissipation.

4. The clean energy generation system according to claim 2, wherein said heat sink includes a tube strung with plural cooling fins, each of said plural cooling fins has a cross-sectional shape of an aircraft wing profile and has a leading edge and a trailing edge; wherein said plural cooling fins are arranged in parallel and in the orientation such that the air/gas flows through said plural cooling fins along the direction from said leading edge to said trailing edge.

5. The clean energy generation system according to claim 2, further comprising at least one air/gas inlet valve and at least one inlet guide vane; wherein each of said at least one air/gas inlet valve is disposed at said tunnel contraction end or said connecting tube, and said at least one air/gas inlet valve is controlled for air/gas inflowing; and each of said at least one inlet guide vane is disposed at said tunnel contraction end or said connecting tube, and said at least one inlet guide vane is controlled for steering air/gas inflowing.

6. The clean energy generation system according to claim 2, further comprising at least one internal guide vane, each of which is disposed at said contraction section, said connecting tube or said diffusion section, and said at least one internal guide vane is controlled for smoothing the air/gas flows in said wind tunnel or in said connecting tube.

7. The clean energy generation system according to claim 1, wherein said clean energy generation system comprises plural energy generation units and at least one said connecting tube, and plural energy generation units are arranged in an open loop so as to form a multiple-unit open loop system, wherein between every two adjacent energy generation units one of said connecting tube is inserted and two ends of said connecting tube are connected respectively to said tunnel diffuser end of one energy generation unit and to said tunnel contraction end of the other energy generation unit.

8. The clean energy generation system according to claim 7, wherein said at least one heating device is located in said contraction section or in said connecting tube; said air/gas compressor is located in said contraction section or in said connecting tube; and said air/gas compressor is between said at least one heating device and said air/gas turbine such that the air/gas is firstly preheated by said at least one heating device and secondly compressed by said air/gas compressor, and then the air/gas flows through said air/gas turbine and drives said air/gas turbine so as to drive said generator to generate electricity; wherein said wind tunnel and said connecting tube are provided with at least one thermal insulating layer for preventing heat dissipation.

9. The clean energy generation system according to claim 7, wherein said heat sink includes a tube strung with plural cooling fins, each of said plural cooling fins has a cross-sectional shape of an aircraft wing profile and has a leading edge and a trailing edge; wherein said plural cooling fins are arranged in parallel and in the orientation such that the air/gas flows through said plural cooling fins along the direction from said leading edge to said trailing edge.

10. The clean energy generation system according to claim 7, further comprising at least one air/gas inlet valve and at least one inlet guide vane; wherein each of said at least one air/gas inlet valve is disposed at said tunnel contraction end or said connecting tube, and said at least one air/gas inlet valve is controlled for air/gas inflowing; and each of said at least one inlet guide vane is disposed at said tunnel contraction end or said connecting tube, and said at least one inlet guide vane is controlled for steering air/gas inflowing.

11. The clean energy generation system according to claim 7, further comprising at least one internal guide vane, each of which is disposed at said contraction section, said connecting tube or said diffusion section, and said at least one internal guide vane is controlled for smoothing the air/gas flows in said wind tunnel or in said connecting tube.

12. The clean energy generation system according to claim 1, wherein said clean energy generation system comprises plural energy generation units and plural said connecting tubes, and plural energy generation units are arranged in an closed loop so as to form a multiple-unit closed loop system, wherein between every two adjacent energy generation units one of plural said connecting tubes is inserted and two ends of said connecting tube are connected respectively to said tunnel diffuser end of one energy generation unit and to said tunnel contraction end of the other energy generation unit.

13. The clean energy generation system according to claim 12, wherein said at least one heating device is located in said contraction section or in said connecting tube; said air/gas compressor is located in said contraction section or in said connecting tube; and said air/gas compressor is between said at least one heating device and said air/gas turbine such that the air/gas is firstly preheated by said at least one heating device and secondly compressed by said air/gas compressor, and then the air/gas flows through said air/gas turbine and drives said air/gas turbine so as to drive said generator to generate electricity; wherein said wind tunnel and said connecting tube are provided with at least one thermal insulating layer for preventing heat dissipation.

14. The clean energy generation system according to claim 12, wherein said heat sink includes a tube strung with plural cooling fins, each of said plural cooling fins has a cross-sectional shape of an aircraft wing profile and has a leading edge and a trailing edge; wherein said plural cooling fins are arranged in parallel and in the orientation such that the air/gas flows through said plural cooling fins along the direction from said leading edge to said trailing edge.

15. The clean energy generation system according to claim 12, further comprising at least one air/gas inlet valve and at least one inlet guide vane; wherein each of said at least one air/gas inlet valve is disposed at said tunnel contraction end or said connecting tube, and said at least one air/gas inlet valve is controlled for air/gas inflowing; and each of said at least one inlet guide vane is disposed at said tunnel contraction end or said connecting tube, and said at least one inlet guide vane is controlled for steering air/gas inflowing.

16. The clean energy generation system according to claim 12, further comprising at least one internal guide vane, each of which is disposed at said contraction section, said connecting tube or said diffusion section, and said at least one internal guide vane is controlled for smoothing the air/gas flows in said wind tunnel or in said connecting tube.

17. The clean energy generation system according to claim 1, further comprising at least one air/gas outlet valve, wherein each of said at least one air/gas outlet valve is disposed at said tunnel diffuser end, and said at least one air/gas outlet valve is controlled for air/gas outgassing.

18. The clean energy generation system according to claim 17, further comprising at least one outlet guide vane, each of which is disposed at said tunnel diffuser end, and said at least one outlet guide vane is controlled for steering air/gas outgassing.

19. The clean energy generation system according to claim 1, wherein said gas is nitrogen gas or carbon dioxide gas.

20. The clean energy generation system according to claim 1, wherein said air/gas turbine has an air/gas turbine inlet located near said contraction section and an air/gas turbine outlet located near said diffuser section, wherein the air/gas temperature at said air/gas turbine inlet is between 102.5° C. and 294.4° C.

* * * * *